United States Patent [19]

Hilsum

[11] Patent Number: 4,551,653
[45] Date of Patent: Nov. 5, 1985

[54] PRODUCTION OF CORRECTION SIGNALS IN A COLOR CRT SYSTEM

[75] Inventor: Cyril Hilsum, Middlesex, England

[73] Assignee: The General Electric Company, p.l.c., United Kingdom

[21] Appl. No.: 613,967

[22] Filed: May 24, 1984

[30] Foreign Application Priority Data

Jun. 2, 1983 [GB] United Kingdom ............... 8315183

[51] Int. Cl.⁴ .............................................. H01J 31/26
[52] U.S. Cl. ...................................... 315/10; 315/371; 358/69
[58] Field of Search ................ 315/10, 370, 371, 368; 358/10, 67, 69

[56] References Cited

U.S. PATENT DOCUMENTS

| | | | |
|---|---|---|---|
| 3,255,304 | 6/1966 | Bendell et al. | 358/10 |
| 4,001,877 | 1/1977 | Simpson | 358/10 |
| 4,035,834 | 7/1977 | Drury | 358/10 |
| 4,123,775 | 10/1978 | Bugni | 358/10 |
| 4,159,484 | 6/1979 | Strathman | 358/67 |

FOREIGN PATENT DOCUMENTS

2446318 4/1975 Fed. Rep. of Germany.
2102258 1/1983 United Kingdom.

OTHER PUBLICATIONS

K. Ando et al., *A Beam Index Color Display System*, S.I.D. 83 Digest, pp. 74–75.

*Primary Examiner*—Theodore M. Blum
*Attorney, Agent, or Firm*—Kirschstein, Kirschstein, Ottinger & Israel

[57] ABSTRACT

A color cathode ray tube display device which is compensated for color distortion due to, e.g. vibration, comprises means (9–12) for producing signals representing the respective color light outputs from the phosphor screen (5), means (13) for comparing the signals with the corresponding color impact video signals and means (14) to provide a correction signal to reduce any deviation between the signals.

9 Claims, 2 Drawing Figures

PRODUCTION OF CORRECTION SIGNALS IN A COLOR CRT SYSTEM

BACKGROUND OF THE INVENTION

1. Field of the Invention

This invention relates to a system including means for producing correction signals for CRT display devices.

2. Description of Related Art

Insofar as applicant is aware, there is no directly related prior art. However, applicant is aware from a European search report of three references, namely U.S. Pat. No. 4,123,775 of Anthony R. Bugni; UK Patent Application No. 2 102 258 A, in which the inventors are Dan F. Denham and Ronald C. Robinder; and German Offenlegungsschrift No. 24 46 318 of The Rank Organization Ltd., the first two of these being catergorized as relevant if taken together and the third being catergorized as technological background. However, BUGNI only is concerned with color temperature of a color television receiver during final production and accordingly is not concerned with continual monitoring and creating the color output from each of the color phosphors during operation of a display device.

DENHAM, et al does not monitor the light output from different color phosphors, but uses an interface mounted on the side of a CRT tube to detect feedback signals indicative of the position of the electron beam.

There also is a fourth reference, a publication entitled "A Beam-Index Color Display System", an article written by Kunio Ando, Fumio Inoue, Hiroshi Jitsukata and Mashiro Eto, published in the SID 83 Digest, at Pages 74–75. In this reference, index phosphor stripes are provided behind the normal color phosphors to provide index signals indicative of the position of the electron beams in contrast to the instant invention, wherein the display phosphors are utilized to provide such information.

SUMMARY OF THE INVENTION

1. Brief Description of the Invention

A colour cathode ray tube (CRT) comprises at least one electron gun for producing a beam of electrons, a luminescent screen having at least two different colour phosphors and means for deflecting the beam(s) of electrons across the screen. The beam(s) must be very accurately controlled to fall on the correct colour phosphors so that the correct colour image results. If the tube is exposed to vibration relative movement between component parts of the tube can lead to colour distortion.

FEATURES OF THE INVENTION

The present invention provides a colour CRT display device including novel means to cause the electron beam(s) to scan correctly the different colour phosphors of the CRT.

Accordingly, the present invention provides a system including a color cathode ray tube (CRT) having electron gun means producing at least one electron beam; a display screen having at least two different color phosphors; means for applying color input signals to the electron gun means; one input signal for each different color phosphor; means for deflecting the electron beam across the screen; and means for utilizing correction signals to control the deflection of the electron beam so as to reduce deviations of color output signals from the CRT from color input signals to the CRT, wherein the improvement comprises having said deflection means including means for producing signals representing the respective light outputs from the different color phosphors substantially at the moment of impact of the electron beam in operation and means for comparing each said color light output signal with the corresponding color input signal to the CRT to thereby provide correction signals indicative of deviations of said output signals from the corresponding input signals which said correction signals are utilized as aforesaid for controlling the deflection of the electron beam.

BRIEF DESCRIPTION OF THE DRAWINGS

One colour cathode ray tube display system in accordance with the invention will now be described, by way of example, with reference to the accompanying drawing, in which.

DESCRIPTION OF THE PREFERRED EMBODIMENTS

Figure 1:
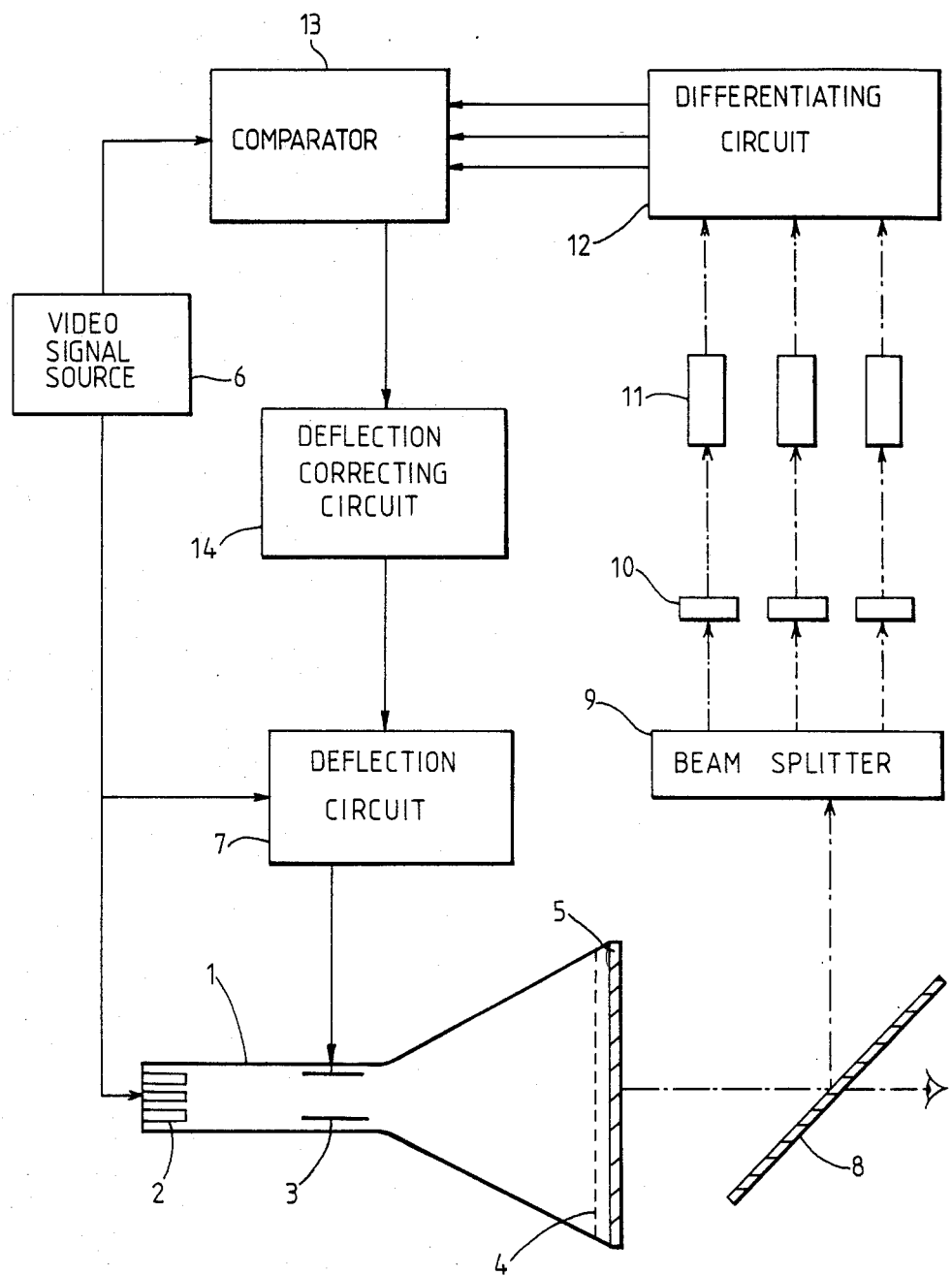
FIG. 1 is a schematic diagram of the system.

Referring to FIG. 1, the system includes a cathode ray tube 1, comprising three electron guns 2, deflection plates 3, a shadow mask 4 and a luminescent screen 5. The synchronising part of a video signal 6 of raster-scan format coming from, for example, a television broadcast receiver (not shown) is utilized to control the operation of a deflection circuit 7. The video part of the signal 6 is split into a luminance signal and three chrominance signals which are fed to the three electron guns 2 in conventional manner. Each of the electron beams from the guns 2 is directed to impinge on the luminescent screen 5, the screen being composed of triads of red, green and blue light emitting phosphor dots, the beams of electrons passing through apertures in the shadow mask 4 so that in normal operation each beam can strike only the phosphor dots of one colour as the beams are scanned across the screen in a rectangular raster by the deflection circuit 7.

A glass plate 8 is placed in front of the screen at a suitable angle to partly reflect the light output from the screen towards a beam splitter 9. The main part of the light output, however, is transmitted through the plate 8 for viewing by an observer. The light reflected by the plate is split into three parts by a beam splitter by the plate is split into three parts by a beam splitter 9, which three parts are directed via colour filters 10 to photodetectors 11. The filters 10 pass only red, blue and green light respectively so that the photodetectors 11 are each responsive only to light output from the CRT screen of one colour.

The output from each of the photodetectors is then applied to a comparator 13 via a differentiating circuit 12.

When an electron beam impinges on a phosphor dot, light which is emitted by the dot is suddenly "switched on" and then slowly fades away. Hence, the light impinging on each photodetector exhibits a series of small rising edges, as each dot in turn of the relevant colour phosphor is hit by an electron beam, plus a large substantially constant component comprising the sum of light emitted by the other dots of the same colour whose light output has not yet faded away. Differentiation of a photodetector output removes this large substantially constant component so that the differentiated output represents only the light output of each dot as it is hit by an electron beam.

In the comparator 13, the output of each photodetector 11 is compared with the corresponding and other colour components of the video signal.

In this way any difference between the contemporary value of each colour component of the video signal and the actual output of light of that colour from the CRT screen due to misdirection of the electron beams can be detected.

For example, if the red electron beam is impinging at least partly on the green phosphor dots this can be detected by the existence of a degree of correlation between the red video signal and the green light output signal.

Appropriate correction signals are then generated in a deflection correcting circuit 14 from the outputs of the comparator 13 and applied to the deflection circuit 7 where they are utilised to produce colour corrected scanning signals for application to the deflection plates 3 such that each electron beam impinges only on phosphor dots of the correct colour.

Figure 2:
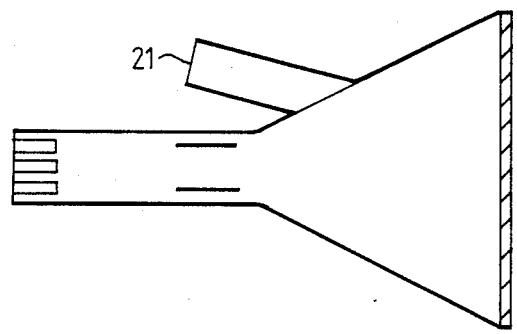
FIG. 2 illustrates a modification of the system.

It will be understood that the use of the glass plate 8 is not essential and other means of directing the light output to the photodetectors may be used. For example, when a CRT without a shadow mask is used, the photodetectors can receive light from the back of the CRT screen via a window 21 provided in the back of the CRT, as shown in FIG. 2.

In a further alternative embodiment of the invention instead of obtaining signals indicating the phosphor dots on which the electron beams are incident at any time by differentiating signals representing the red, green and blue light produced at the screen, use is made of the spectral shift in the light outputs of the phosphor dots caused by the momentary temperature rise of a dot as an electron beam impinges on it.

A beam typically causes a temperature rise of 100° C. or more if it is energetic, as it is in bright displays. This means that the wavelength emitted by a phosphor dot changes momentarily as an electron beam passes over it. Interference filters can therefore be used to separate, for application to the detectors 11, the light emitted at the highest temperature i.e. at incidence of an electron beam on phosphor dots, from the light emitted at other times, i.e. during afterglow. By adding signature materials to the phosphor dots the effect can be accentuated and non visible light outputs from the dots may be used.

Whilst, as indicated above, the invention finds application in correcting colour distortion in a colour CRT display device due to vibration, the invention may also be utilised as a primary means of electron beam steering so that, for example, the use of a shadow mask in a colour CRT may be dispensed with.

It should further be understood that the use of a separate photodetector for each colour phosphor is not essential since, for example in the case of three phosphors, the use of two photodetectors is sufficient for deducing information about three electron beams, if the amplitude is also used since the sum of each of the different colour light outputs is equal to the total brightness intended.

It will further be understood that whilst a display system in accordance with the invention using a three electron gun shadow mask CRT has been described by way of example, the invention is applicable to display devices utilising other kinds of colour CRT.

I claim:

1. A system including a color cathode ray tube (CRT) having electron gun means producing at least one electron beam; a display screen having at least two different color phosphors; means for applying color input signals to the electron gun means; one input signal for each different color phosphor; means for deflecting the electron beam across the screen; and means for utilizing correction signals to control the deflection of the electron beam so as to reduce deviations of color output signals from the CRT from color input signals to the CRT, wherein the improvement comprises having said deflection means including means for producing signals representing the respective light outputs from the different color phosphors substantially at the moment of impact of the electron beam in operation and means for comparing each said light output signal with said color input signals to the CRT to thereby provide correction signals indicative of deviations of said output signals from the corresponding input signals which said correction signals are utilized as aforesaid for controlling the deflection of the electron beam.

2. A colour CRT display device according to claim 1 wherein said means for producing signals representing the respective light outputs from the different colour phosphors includes colour filter means for separating the light outputs from the different colour phosphors and photodetector means, responsive to light transmitted by said filter means.

3. A colour CRT display device according to claim 2 wherein said means for producing signals representing the respective light outputs from the different colour phosphors further comprises differentiating means for differentiating the outputs of said photodetector means.

4. A colour CRT display device according to claim 2 wherein said filter means separates the light outputs of the phosphors, at the moment of impact of the electron beam from the light produced at other times.

5. A colour CRT display device according to claim 4 wherein said filter means comprises interference filters.

6. A colour CRT display device according to claim 4 or claim 5 wherein said phosphors contain signature materials to enhance the difference between the light output at the moment of impact of the electron beam and other times.

7. A colour CRT display device according to claim 6 wherein said signature materials produce non-visible light.

8. A colour CRT display device according to claim 1 further comprising a glass plate, between said CRT screen and an observer, at an appropriate angle so as to partly reflect the light output from the screen to said means for producing signals representing the respective light outputs from the different colour phosphors.

9. A colour CRT display device according to claim 1 wherein said CRT has a window at the rear of the screen of the CRT and said means for producing said signals representing the respective light outputs from the different colour phosphors is responsive to light transmitted from the CRT screen via said window.

* * * * *